May 31, 1927.
T. H. WILLIAMS
1,630,915
SHOCK ABSORBER
Filed April 26, 1926
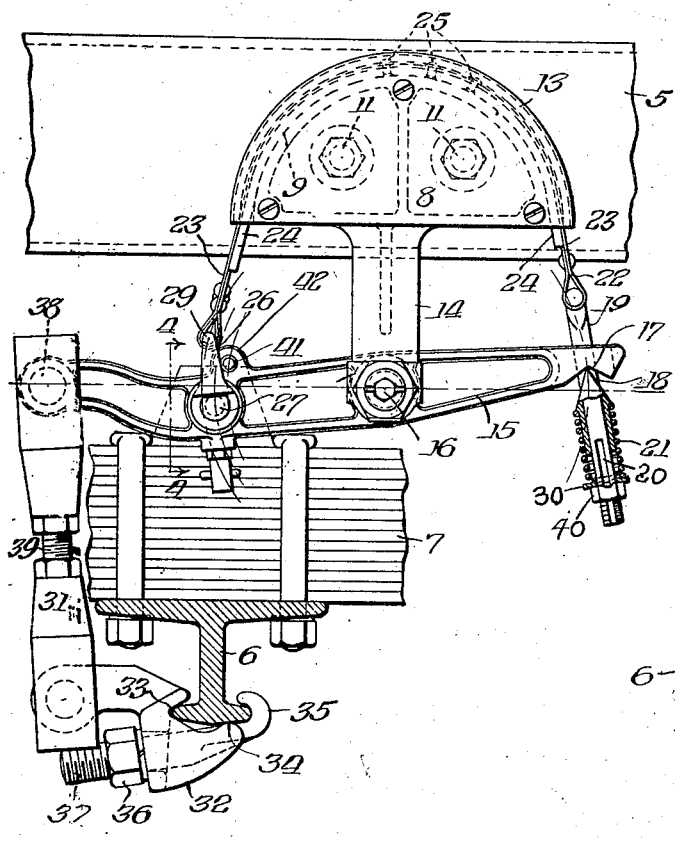
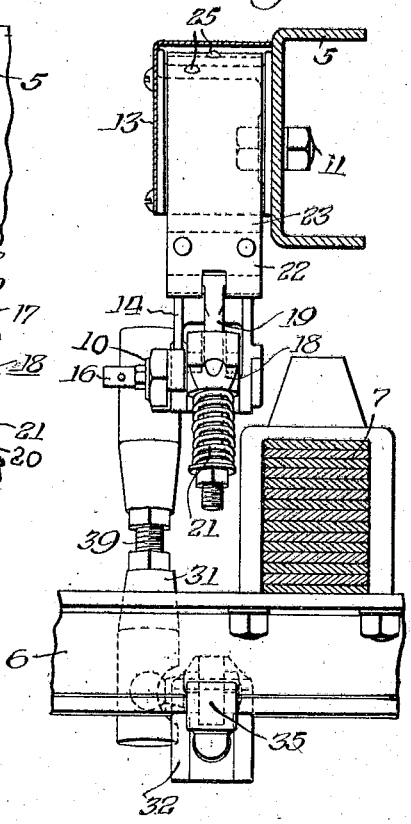
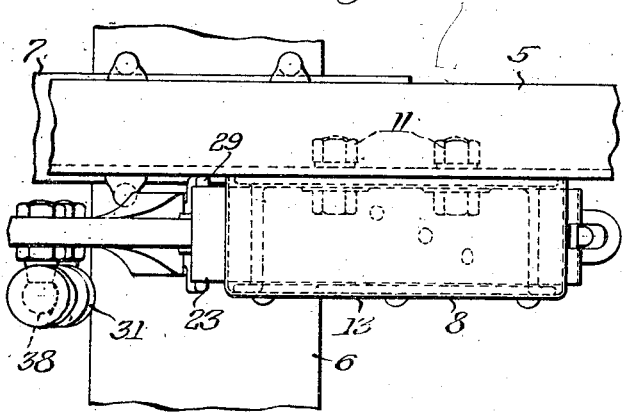
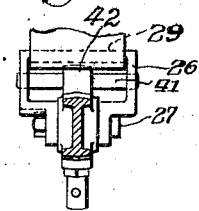
Inventor
Theron H. Williams Patented May 31, 1927.

1,630,915

UNITED STATES PATENT OFFICE.

THERON H. WILLIAMS, OF CHICAGO, ILLINOIS.

SHOCK ABSORBER.

Application filed April 26, 1926. Serial No. 104,521.

This invention relates to shock absorbers particularly designed for use on vehicles such as automobiles and the like, although the principles thereof may be utilized in structures suitable for other purposes.

One of the primary purposes of my invention is to provide a shock absorber which will serve to damp or retard the relative movements between a vehicle chassis and running gear in both directions from a normal or neutral position, the structure being so designed that the resistance offered to such relative movements of the vehicle parts will increase proportionately to the relative displacement of the parts from normal position and will proportionately decrease as the parts return to normal position. In other words, the resistance offered to the approach beyond normal position of the chassis and running gear will increase in proportion to the extent of such abnormal approach and will therefore tend not only to retard or diminish the approach but will also tend to retard or diminish the speed of return to normal position. The same action and retarding effect are produced by abnormal separation of the chassis and running gear from each other. My invention, therefore, tends to prevent excessive relative movements between the chassis and running gear, minimizes the shocks and jars incident to such movements, reduces the wear and strain upon the vehicle parts, and promotes the comfort of the occupants of the vehicle.

Another object of my invention is the provision of a shock absorber which will be simple in construction, economical to manufacture, easy to assemble and mount upon the vehicle, and one which will have but few moving parts which will not be liable to excessive wear but will be durable, efficient, and long-lived in use.

Other objects and many of the inherent advantages of my invention will be readily appreciated as the same becomes better understood by reference to the following description when considered in connection with the accompanying drawing, in which:

Fig. 1 is a fragmentary side elevation of a vehicle chassis and running gear with my invention applied thereto, Fig. 2 is an end view looking toward the left at Fig. 1, Fig. 3 is a plan view, and Fig. 4 is a fragmentary sectional view taken on the line 4—4 of Fig. 1.

On the drawings a portion of the chassis frame is indicated by reference character 5. One of the axles of the running gear is indicated by reference character 6, and the spring mounted thereon in the usual manner is indicated by 7.

My improved shock absorber is adapted to be connected to the chassis and running gear of a vehicle or to other relatively movable parts, the relative movement between which it is desirable to control. While, for purposes of illustration, I have shown in the present instance the rigid friction member as attached to the chassis and the end of the lever as connected with the running gear, it should be manifest that this arrangement may be reversed if preferred, and consequently the arrangement shown should be considered as illustrative merely and as imposing no restriction upon the scope of my invention.

As illustrated herein, a rigid friction member 8 having a curved friction surface 9 in the form of a semi-cylindrical drum is fixedly attached to the chassis frame 5 by a plurality of bolts 11. This friction member is suitably inclosed in and protected by a surrounding housing 13. Preferably cast integrally with this rigid friction member is a depending lug or arm 14, preferably bifurcated at its lower end to accommodate a lever 15 which is fulcrumed to the arm upon a fulcrum bolt or pin 10 provided with a lubricating device 16.

One arm of the lever is provided in proximity to its outer end with a recess 17 adapted to accommodate the tapered head 18 of a rocking spring seat slidably surrounding the adjusting bolt 19 which extends through a slot in the lever 15. The bolt 19 is longitudinally grooved at 20 to receive inwardly extending projections on a combined spring seat and lock washer 30 surrounding the bolt whereby the washer is held against rotation. The lock washer is also provided on its lower face with a rib to engage in a groove on the upper face of the adjusting nut 40 so that the nut cannot be turned without moving the washer upwardly away from the nut against the force of spring 21 interposed between the washer and the enlarged upper portion of the seat. This assembly provides a yieldable rocking connection between the lever and one end 22 of a flexible friction member looped over and embracing the friction surface of the curved member 8, and this connection may be adjusted by means of the nut 40 to cars of different weights and to take up wear of the friction strap. While the flexible friction member may be of any preferred construction, it is illustrated herein as comprising a metal band 23 possessing great tensile strength, lined with a strip of friction material 24, such as a suitable textile brake lining for instance, which is attached to the metal band 23 by a plurality of rivets 25 intermediate the ends of the band only, so that any liability of buckling or crinkling as the result of compression exerted thereon is obviated.

The other end of the flexible friction member is connected through the intermediary of a link 26 with the lever 15 at the opposite side of the fulcrum 10 from the bolt 19. This link is connected by a pivot pin 27 with the lever at a point between the fulcrum and the projecting end 38 of said lever and is capable of swinging movements about the pivot 27 to vary the effective length of the lever arm between the lever fulcrum and the point of connection 29 of the link to the flexible friction member 23, for a purpose which will presently appear.

The projecting end 38 of the lever is connected through an adjustable link 31 with a clamp adapted to be rigidly connected to the vehicle axle, and in order that a rigid connection may be established with axles of various dimensions, the clamp comprises a body 32 providing a jaw 33 and a pair of bearing surfaces 34, and a clamping jaw 35 opposed to the jaw 33 and adapted to be closed toward the jaw 33 by a nut 36 threaded onto the extension 37 of the jaw 35. This clamp provides a three-point contact with the axle which insures a tight fit and a rigid connection, and these results will be attained irrespective of the size of the axle, since the jaw 35 is capable of a considerable range of adjustment.

The parts are assembled on a car in the manner shown in the drawings and from reference to Fig. 1 it will be observed that when the chassis is in normal relation to the running gear, the distance from the chassis to the center of the pivotal connection 38 between the end of the lever and the link 31 is equal to the distance between the chassis and the center of the fulcrum bolt 16. This proper position of the lever can be obtained by lengthening or shortening the link 31 as may be necessary through the adjustable connecting bolt 39. The distance between the pin 27 and the fulcrum 10, by which the left hand end, viewing Fig. 1, of the flexible band is attached to the lever 15, is less than the distance between the fulcrum bolt 10 and the point 17 on the lever to which the right hand end of said band is connected. The effective lengths of the lever arms, therefore, to which the ends of the band are connected, are different, with the result that swinging movement of the lever on its fulcrum will tend to increase or decrease the tension on the band and thereby the friction between the band and the stationary friction member, depending upon the direction in which the lever is rocked.

Assuming, for instance, that the vehicle wheel runs over an obstruction which raises the wheel quickly, relatively to the chassis, the lever 15, through the link 31, will accordingly be rocked in a clockwise direction, viewing Fig. 1, and since the effective length of the right hand arm is greater than the effective length of the left hand arm of the lever, the right hand end of the friction band will be pulled downwardly faster than the left hand end is let in, and as a result, the friction exerted by the band upon the curved friction member will increase in proportion to the movement of the lever. Since relative movement between the chassis and the running gear necessarily involves rocking movement of the lever and sliding movement of the flexible band upon the stationary friction member, it is obvious that resistance to the movement of the band produces resistance against relative movement of the chassis and running gear in either direction. The device, therefore, upon abnormal approach of the chassis and running gear, offers an increasing resistance to the approaching movement proportionately to the extent of said movement and also offers a corresponding resistance to the return of said parts toward normal position, the resistance upon the return, however, being gradually decreased as the parts approach normal.

Should the vehicle wheel drop into a hole, the lever will be rocked in a counterclockwise direction, and in order that an increasing resistance may be offered to separating movements of the chassis and running gear away from normal position, I have devised a construction which automatically varies the effective length of one of the arms of said lever. This device consists of a bar or pin 41 extending transversely of the lever and above the same from a boss 42 formed on the lever. This pin engages the link 26 as shown in Fig. 1 when the parts are in normal position. Upon rocking movement of the lever, however, in a counterclockwise direction, the upper end 29 of the link 26, instead of moving downwardly in a substantially straight line as it would if it were free to move about its pivotal connection 27 with the lever, is caused to travel radially outwardly away from the fulcrum 10 so as to thereby increase the effective length of the lever arm and pull downwardly upon the band faster than its opposite end is being paid in. The result is that the friction is increased proportionately to the extent of separating movement beyond normal of the chassis and running gear.

The apparatus, therefore, provides an increasing resistance to relative movements between the chassis and running gear in both directions away from their normal relative position. This desirable action of the device is further facilitated and increased by the position of the lever itself. From Fig. 1 it will be observed that point of connection between the right hand end of the friction band and the lever is above a horizontal plane passing through the fulcrum and that the connection 29 with the left hand end of the band is also above this plane. Upon swinging movement of the lever in a clockwise direction, the right hand connection with the band moves slightly outwardly to thereby increase the length of this lever arm, while the connection with the left hand end of the band moves slightly inwardly on an arc to decrease the effective length of the left hand lever arm. Upon rocking movement of the lever in a counterclockwise direction, the right hand end moves inwardly on an arc to decrease the lever arm and the pull on the band, while the left hand end travels outwardly, which outward movement is also increased by the pin 41 so that the tension exerted upon this end of the band is increased.

It should be apparent from the foregoing that I have provided a shock absorber which possesses many desirable characteristics both in its structure and mode of operation, and while I have shown and described a preferred embodiment, the structural details may obviously be varied within wide limits without exceeding the scope of the invention as defined in the following claims.

I claim:

1. A shock absorber adapted to be connected to the chassis and running gear of a vehicle, comprising a friction member, a friction band looped between its ends over said member, and means acting through said band to oppose frictional resistance to relative movement of said chassis and running gear in proportion to the extent of said movement in both directions away from normal position.

2. A shock absorber adapted to be connected with the chassis and running gear of a vehicle, comprising a friction member, a band looped between its ends over said member, and means including a lever connected to said band for causing the same to frictionally oppose relative movement of said chassis and running gear in both directions away from their normal relative position and in proportion to the extent of said movement.

3. A shock absorber adapted to be connected with the chassis and running gear of a vehicle, comprising a curved friction member, a friction band looped over and frictionally engaging said member, and means including a lever pivotally connected to both the chassis and running gear and to which the ends of said band are connected at opposite sides of the fulcrum of the lever whereby the frictional resistance offered by the band to relative movements of said chassis and running gear away from normal position is increased in proportion to the extent of said movement away from normal and decreased proportionately to the return to normal.

4. A shock absorber adapted to be connected to two relatively movable parts of a vehicle, comprising a rigid friction member, a flexible friction member associated therewith, a lever to which the ends of said flexible member are connected, the lever being so constructed and mounted as to increase the friction between said members upon movement of the lever in either direction from a normal position, and means for actuating said lever proportionately to the relative movements between said vehicle parts.

5. A shock absorber adapted to be connected to two relatively movable parts of a vehicle, comprising a rigid friction member, a flexible friction member associated therewith and movable relatively thereto, a lever fulcrumed intermediate its ends and connected with the ends of said flexible member at opposite sides of said fulcrum, a connection between said lever and one of said vehicle parts, and means for automatically varying the effective length of the lever arms to which one end of the flexible member is connected, during rocking movements of said lever about its fulcrum.

6. A shock absorber adapted for connection to two relatively movable parts of a vehicle, comprising a rigid friction member, a flexible friction member movable relatively thereto, a lever fulcrumed intermediate its ends, a yieldable connection between one end of said flexible member and said lever, a connection movable radially with respect to the lever fulcrum between the other end of said flexible member and the lever, and a connection between said lever and one of said vehicle parts.

7. A shock absorber adapted to be connected to two relatively movable parts of a vehicle, comprising a rigid friction member mounted on one of said parts, a lever fulcrumed on said member, a flexible friction member embracing said rigid member, a yieldable connection including a spring between one end of said flexible member and said lever, a link pivotally connecting the other end of said flexible member with said lever, the end of said lever being extended beyond said link, a connection between said extended end of said lever and the other vehicle part, and means carried by said lever for swinging said link to vary the tension on said flexible member during rocking movements of said lever.

8. A shock absorber adapted to be connected to two relatively movable parts of a vehicle, comprising a friction member, a friction band looped between its ends over said member and means acting through said band to oppose frictional resistance to relative movement between said relatively movable parts in either direction proportionately to the remoteness of said parts from normal relative position.

9. A shock absorber adapted to be connected to two relatively movable parts of a vehicle, comprising a friction member, a looped band frictionally engaging said member, a lever connected to one end of said band, and a yieldable and adjustable connection between said lever and the other end of said band.

10. A shock absorber adapted to be connected to two relatively movable parts of a vehicle, comprising a friction member, a looped band frictionally engaging said member, a lever connected to one end of said band, a bolt connected with the other end of said band and projecting through said lever, a seat engaging said lever and slidable longitudinally of the bolt, and a spring between the bolt and the seat whereby a yieldable connection between the lever and said band is established.

11. A shock absorber adapted to be connected to two relatively movable parts of a vehicle, comprising a friction member, a looped band frictionally engaging said member, a lever connected to one end of said band, a bolt connected with the other end of said band and projecting through said lever, a seat engaging the lever and movable relatively to the bolt, a rib bed washer slidably but non-rotatably associated with the bolt, a grooved nut threaded onto the bolt and engaged with said washer, and a spring interposed between said seat and said washer.

12. A shock absorber adapted to be connected to two relatively movable parts of a vehicle, comprising a friction member, a looped band frictionally engaging said member, a lever connected to one end of said band, a bolt connected with the other end of said band and projecting through said lever, a knife-edged seat engaging said lever and slidable longitudinally of the bolt, said bolt and seat being provided with interengaging parts whereby the seat is held against rotation on the bolt, a nut adjustably threaded onto the bolt, a lock washer slidable on the bolt, and a spring interposed between said seat and said lock washer, said nut and lock washer being constructed for interengagement whereby the nut is locked against accidental rotation.

13. A shock absorber adapted to retard the relative movement between two parts of a vehicle, comprising a curved friction member secured to one of said parts, a friction band looped over and frictionally engaging said member, and means including a lever positively linked at a point spaced from its fulcrum to the other of said parts, both ends of said band being connected to said lever whereby the frictional resistance of said band to movements of said lever is varied in relation to the extent of relative movement between said chassis and running gear in both directions away from normal relative position.

14. A shock absorber adapted to retard the relative movement between two parts of a vehicle, comprising a curved friction member secured to one of said parts, a friction band looped over and frictionally engaging said member, and a lever to which the ends of said band are connected at opposite sides respectively of the lever fulcrum, the effective lever arms of said lever being of unequal length, said lever being directly connected at a point spaced from its fulcrum to the other of said parts whereby said lever is positively actuated in accordance with the relative movement of said parts.

15. A shock absorber adapted to retard the relative movement between two parts of a vehicle, comprising a rigid friction member on one of said parts, a friction band frictionally engaged between the ends with said member, a lever fulcrumed intermediate its ends and connected on opposite sides of the fulcrum with the respective ends of said band, said lever being so constructed and positioned that swinging movements thereof on its fulcrum will vary the friction between said band and said member to thereby control the relative movement between said vehicle parts, said lever being positively connected at a point spaced from its fulcrum to the other of said parts whereby it is positively actuated by the relative movement of said parts.

16. A shock absorber adapted to retard the relative movement between two parts of a vehicle, comprising a rigid friction member on one of said parts, a flexible friction member associated therewith, a lever to which the ends of said flexible member are connected on the opposite sides of the lever fulcrum, the effective lever arms of said lever between the points of connection of the flexible member thereto and the fulcrum being of unequal length, and means for positively actuating said lever in accordance with the relative movement of said parts.

17. A shock absorber adapted to retard the relative movement between two parts of a vehicle, comprising a friction member on one of said parts, a looped friction band frictionally engaged between its ends with said member, and a lever fulcrumed between its ends and connected at opposite sides of the fulcrum with the ends of said band, said lever being so shaped and disposed relatively to the friction member that the arcuate travel of the connections between the band and said lever varies the friction between the band and said member in porportion to the extent of movement of the lever, said lever being positively connected at a point spaced from its fulcrum to the other of said parts whereby said lever is positively actuated in accordance with the relative movements of said parts.

18. A shock absorber adapted to be connected to two relatively movable parts of a vehicle, comprising a friction member, a looped band frictionally engaging said member, a lever connected to one end of said band, and a yieldable connection between said lever and the other end of said band.

19. A shock absorber adapted to be connected to two relatively movable parts of a vehicle, comprising a friction member, a looped band frictionally engaging said member, a lever connected to one end of said band, and a contractable connection between said lever and the other end of said band whereby the tension of the band about the friction member is lessened when the pull is through the contractable connection.

In witness of the foregoing I affix my signature.

THERON H. WILLIAMS.